US011948725B2

(12) United States Patent
Kojima et al.

(10) Patent No.: US 11,948,725 B2
(45) Date of Patent: Apr. 2, 2024

(54) ELECTRONIC COMPONENT

(71) Applicant: Murata Manufacturing Co., Ltd., Kyoto-fu (JP)

(72) Inventors: Keijiro Kojima, Nagaokakyo (JP); Yuya Ishida, Nagaokakyo (JP); Hiroyuki Sugie, Nagaokakyo (JP); Katsuyuki Takahashi, Nagaokakyo (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 922 days.

(21) Appl. No.: 16/201,857

(22) Filed: Nov. 27, 2018

(65) Prior Publication Data

US 2019/0180926 A1 Jun. 13, 2019

(30) Foreign Application Priority Data

Dec. 8, 2017 (JP) ................................ 2017-236093

(51) Int. Cl.
*H01F 27/29* (2006.01)
*H01F 1/28* (2006.01)
(Continued)

(52) U.S. Cl.
CPC ............... *H01F 27/29* (2013.01); *H01F 1/28* (2013.01); *H01F 5/04* (2013.01); *H01F 17/045* (2013.01);
(Continued)

(58) Field of Classification Search
CPC ................................ H01F 27/29; H01F 27/24
(Continued)

(56) References Cited

U.S. PATENT DOCUMENTS 5,003,279 A * 3/1991 Morinaga ............ H01F 27/292 336/192
5,251,094 A * 10/1993 Amano ............... H01G 13/006 29/25.42
(Continued)

FOREIGN PATENT DOCUMENTS

CN 105938754 A 9/2016
CN 107256773 A 10/2017
(Continued)

OTHER PUBLICATIONS

An Office Action issued by the China National Intellectual Property Administration dated Oct. 9, 2020, which corresponds to Chinese Patent Application No. 201811243704.6 and is related to U.S. Appl. No. 16/201,857 with English language translation.
(Continued)

*Primary Examiner* — Bickey Dhakal
*Assistant Examiner* — Joselito S. Baisa
(74) *Attorney, Agent, or Firm* — Studebaker & Brackett PC

(57) ABSTRACT

A wire-wound coil component is an electronic component including a core main body, such as a molded body, containing a magnetic powder resin in which a resin serves as a binder, and an oxide film covering at least a portion of the surface, such as the lower surface, of the core main body. The electronic component further includes an external electrode including a base layer formed on the surface of the oxide film. The base layer is a metal layer having high affinity for oxygen.

13 Claims, 1 Drawing Sheet

(51) Int. Cl.

| | |
|---|---|
| ***H01F 5/04*** | (2006.01) |
| ***H01F 17/04*** | (2006.01) |
| ***H01F 27/24*** | (2006.01) |
| ***H01F 27/28*** | (2006.01) |

(52) U.S. Cl.
CPC ......... *H01F 27/24* (2013.01); *H01F 27/2823* (2013.01); *H01F 27/2828* (2013.01); *H01F 27/292* (2013.01)

(58) Field of Classification Search
USPC .......................................................... 336/192
See application file for complete search history.

(56) References Cited

U.S. PATENT DOCUMENTS

| | | | | |
|---|---|---|---|---|
| 5,651,844 | A * | 7/1997 | Longenberger | C22F 1/08 148/683 |
| 6,242,996 | B1 * | 6/2001 | Sato | H01F 17/045 336/200 |
| 6,356,430 | B1 * | 3/2002 | Yoshida | H01L 41/0472 361/321.2 |
| 6,373,366 | B1 * | 4/2002 | Sato | H01F 27/292 336/200 |
| 6,377,151 | B1 * | 4/2002 | Takayama | H01F 41/06 336/83 |
| 6,525,395 | B1 * | 2/2003 | Kawase | H01F 41/041 257/772 |
| 6,661,328 | B2 * | 12/2003 | Inoue | H01F 41/127 336/83 |
| 7,277,001 | B2 * | 10/2007 | Mizushima | H01F 17/04 336/192 |
| 8,289,121 | B2 * | 10/2012 | Yan | H01F 17/045 336/221 |
| 9,378,884 | B2 * | 6/2016 | Kim | H01F 41/046 |
| 9,947,460 | B2 * | 4/2018 | Hirose | H01F 1/344 |
| 10,224,138 | B2 * | 3/2019 | Lee | H01F 27/022 |
| 10,541,078 | B2 * | 1/2020 | Sato | H01F 27/323 |
| 10,867,739 | B2 * | 12/2020 | Uchida | H01F 27/2823 |
| 11,011,294 | B2 * | 5/2021 | Sato | H01F 17/04 |
| 2007/0126087 | A1 * | 6/2007 | Owaki | H03H 9/1071 257/664 |
| 2008/0241368 | A1 * | 10/2008 | Komuro | C23C 18/00 106/287.18 |
| 2009/0091412 | A1 * | 4/2009 | Shin | H01F 1/26 336/83 |
| 2012/0153779 | A1 * | 6/2012 | Sato | H03H 9/1021 310/344 |
| 2015/0022309 | A1 * | 1/2015 | Marusawa | C08K 3/08 336/221 |
| 2015/0115766 | A1 * | 4/2015 | Taguchi | H01F 27/02 310/216.001 |
| 2016/0268038 | A1 * | 9/2016 | Choi | H01F 27/255 |
| 2017/0178777 | A1 | 6/2017 | Ishida et al. | |
| 2017/0294260 | A1 | 10/2017 | Ishida | |
| 2017/0309389 | A1 * | 10/2017 | Sato | H01F 27/29 |
| 2019/0272948 | A1 * | 9/2019 | Hwang | C09D 7/40 |
| 2021/0043369 | A1 * | 2/2021 | Otani | H01F 27/292 |

FOREIGN PATENT DOCUMENTS

| | | | | | |
|---|---|---|---|---|---|
| CN | 107275057 | A | | 10/2017 | |
| CN | 109545503 | A | * | 3/2019 | H01F 17/0013 |
| CN | 110060853 | A | * | 7/2019 | H01F 27/022 |
| CN | 109155184 | B | * | 3/2021 | C08K 3/40 |
| DE | 102019208188 | A1 | * | 1/2020 | H01F 17/045 |
| EP | 1006535 | A1 | * | 6/2000 | H01F 27/292 |
| JP | 08138948 | A | * | 5/1996 | |
| JP | 2011-151252 | A | | 8/2011 | |
| JP | 2013-045926 | A | | 3/2013 | |
| JP | 2013-201374 | A | | 10/2013 | |
| JP | 2015076653 | A | * | 4/2015 | |
| JP | 2015-204337 | A | | 11/2015 | |
| JP | 2015216091 | A | * | 12/2015 | C03C 8/18 |
| JP | 2016-076559 | A | | 5/2016 | |
| JP | 2017-112218 | A | | 6/2017 | |
| JP | 2018063995 | A | * | 4/2018 | |
| JP | 6547651 | B2 | * | 7/2019 | H01F 17/0006 |
| JP | 6627731 | B2 | * | 1/2020 | H01F 17/04 |
| KR | 20140071756 | A | * | 6/2014 | |
| WO | WO-2018110368 | A1 | * | 6/2018 | C04B 35/26 |

OTHER PUBLICATIONS

An Office Action mailed by China National Intellectual Property Administration dated Aug. 4, 2021 which corresponds to Chinese Patent Application No. 201811243704.6 and is related to U.S. Appl. No. 16/201,857 with English language translation.

An Office Action; "Notification of Reasons for Refusal," issued by the Japanese Patent Office dated Feb. 4, 2020, which corresponds to Japanese Patent Application No. 2017-236093 and is related to U.S. Appl. No. 16/201,857; with English language translation.

* cited by examiner

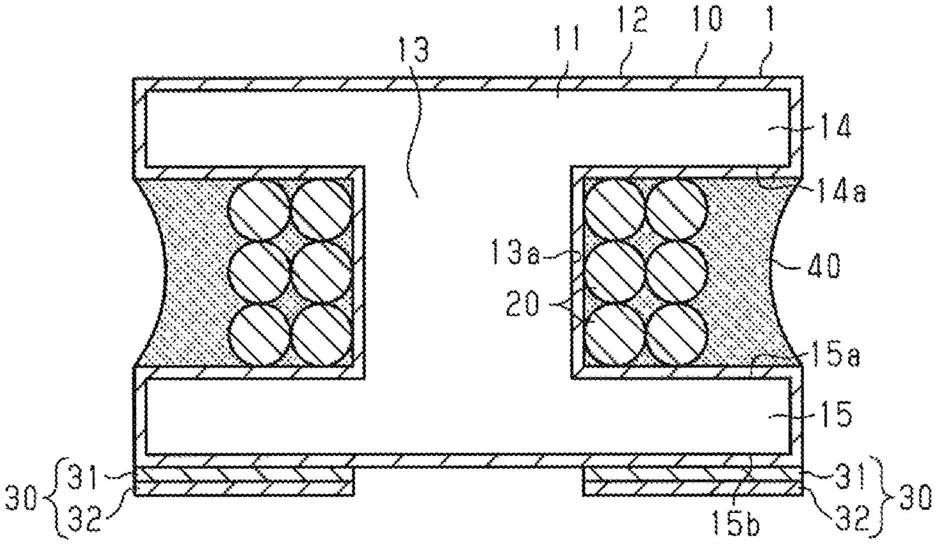
13
11
12
10
1
14
14a
13a
40
20
15a
15
31
30
32
15b

ELECTRONIC COMPONENT

CROSS-REFERENCE TO RELATED APPLICATION

This application claims benefit of priority to Japanese Patent Application No. 2017-236093, filed Dec. 8, 2017, the entire content of which is incorporated herein by reference.

BACKGROUND

Technical Field

The present disclosure relates to an electronic component.

Background Art

An electronic component, such as a coil component, has external electrodes that connect the electronic component to a printed circuit board as described, for example, Japanese Unexamined Patent Application Publication No. 2013-201374. The external electrode includes a metal layer, such as a chromium (Cr) layer, that is formed by, for example, sputtering.

SUMMARY

In an electronic component, adhesion of an external electrode is sometimes insufficient. This decreases connection strength (bonding strength) of the electronic component to the printed circuit board, and thus, connection stability may be decreased.

Accordingly, the present disclosure provides an electronic component having high bonding strength.

According to one embodiment of the present disclosure, the electronic component includes a molded body containing a magnetic powder resin in which a resin serves as a binder, an oxide film covering at least a portion of a surface of the molded body, and an external electrode including a base layer formed on a surface of the oxide film. The base layer is a metal layer having high affinity for oxygen. This configuration results in high adhesion between the molded body and the oxide film and between the base layer of the external electrode and the oxide film covering the molded body, thereby improving bonding strength of the electronic component to a printed circuit board.

The above-described electronic component preferably contains at least one of Cr, Ti, V, Sc, Mn, Y, Zr, Nb, Mo, Tc, Hf, Ta, W, and Re. This configuration provides a metal layer having high affinity specifically for oxygen.

In the above-described electronic component, the oxide film preferably contains a metal oxide to which an organic chain is bonded. This configuration further improves the bonding strength of the electronic component to a printed circuit board.

In the oxide film of the above-described electronic component, the amount of a metal element to which an organic chain is bonded is preferably about 0.5-fold or more and about 1.5-fold or less (i.e., from about 0.5-fold to about 1.5-fold) the amount of a metal element to which no organic chain is bonded. This configuration reliably improves thermal-shock resistance.

In the above-described electronic component, the oxide film preferably contains TiO or SiO. This configuration improves mass productivity.

In the above-described electronic component, the organic chain preferably contains any of an epoxy group, an amino group, an isocyanurate group, an imidazole group, a vinyl group, a mercapto group, a phenol group, and a methacryloyl group. This configuration further reliably improves thermal-shock resistance.

In the above-described electronic component, the binder is preferably an epoxy resin. This configuration further improves bonding strength and insulating properties.

In the above-described electronic component, it is preferable that the molded body be wound with a wire and that an end portion of the wire be connected to the external electrode. This configuration provides a wire-wound coil component having high bonding strength with respect to a printed circuit board.

In the above-described electronic component, it is preferable that the oxide film be further interposed between the wire and the molded body. This configuration suppresses generation of a leakage current path from the wire through the molded body.

In the above-described electronic component, the oxide film preferably covers the entire surface of the molded body. This configuration provides high insulating properties.

According to an aspect of the present disclosure, an electronic component having an improved bonding strength with respect to a printed circuit board is provided.

Other features, elements, characteristics and advantages of the present disclosure will become more apparent from the following detailed description with reference to the attached drawing.

BRIEF DESCRIPTION OF THE DRAWING

The FIGURE is a schematic cross-sectional view of a wire-wound coil component.

DETAILED DESCRIPTION

Hereinafter, embodiments according to an aspect of the present disclosure will be described.

To facilitate understanding, components may be enlarged in the accompanying drawing. The size and proportion of the components may differ from those of the actual components or those of the components in other FIGURES. In a cross-sectional view, hatching is used to facilitate understanding; however, hatching may be omitted in some of the components.

A wire-wound coil component 1 illustrated in the FIGURE is an example of the electronic component. The wire-wound coil component 1 includes a core 10, a wire 20 wound around the core 10, external electrodes 30 connected to the wire 20, and a covering resin 40 sealing the wire 20 wound around the core 10.

The core 10 includes a core main body 11 serving as a molded body and an oxide film 12. The external electrode 30 includes a base layer 31 and a plating layer 32.

The core main body 11 includes a wound core portion 13 extending in a vertical direction and flange portions 14 and 15 respectively formed at the upper end and lower end of the wound core portion 13. The surface of the core main body 11 includes a ground portion. The ground portion is a surface formed by predetermined grinding treatment during formation of the core main body 11. The predetermined grinding treatment may be barrel finishing. The upper side and the lower side in the present specification is determined based on a direction perpendicular to the main surface of a printed circuit board on which the electronic component is mounted.

The lower side is a side near the printed circuit board in the above-mentioned direction, and the upper side is the side opposite to the lower side.

The core main body 11 contains a magnetic powder resin containing, for example, a resin and a metal powder. Specifically, the core main body 11 is a molded body containing a magnetic powder resin that contains a magnetic metal powder and a resin serving as a binder. The resin is preferably an epoxy resin. This further improves bonding strength and insulating properties. Examples of the resin include thermosetting resins, such as a phenol resin and a silicone resin, in addition to the above-described epoxy resin. The core main body 11 is obtained, for example, by mixing a magnetic metal powder with the above-described binder, molding the mixture by using a mold, and applying heat to harden the binder.

The magnetic metal powder may be a metal powder of pure iron (Fe) or an Fe alloy. Examples of such an Fe alloy include FeNi, FeCo, FeSi, FeSiCr, FeSiAl, FeSiBCr, and FePCSiBNbC. Theses powders may be used alone or in a combination of two or more. A carbonyl iron powder formed by heat-decomposing pentacarbonyl iron may be used instead of the above-described pure iron powder.

The core main body 11 is covered by the oxide film 12. In the present embodiment, the oxide film 12 is formed so as to cover the entire surface of the core main body 11. The oxide film 12 does not necessarily cover the entire surface of the core main body 11 and may partially cover the surface of the core main body 11. To be interposed between the wire 20 and the core main body 11, the oxide film 12 may be formed so as to cover a surface of the wound core portion 13 that is wound by the wire 20 (side surface 13*a* of the wound core portion 13) and internal side surfaces 14*a* and 15*a* of the flange portions 14 and 15 with which the wire 20 is otherwise in contact. The oxide film 12 may further cover a portion of the lower surface of the flange portion 15. In a case where the oxide film 12 is a film covering the entire surface of the core main body 11, producing a mask and patterning are unnecessary when the oxide film 12 is formed. Thus, the oxide film 12 can be effectively formed.

The oxide film 12 is formed so as to be interposed at least between each of the external electrodes 30, which will be described later, and the core main body 11. In particular, the oxide film 12 is preferably formed so as to entirely cover a lower surface 15*b* of the flange portion 15 where the external electrodes 30 are formed.

The oxide film 12 is a film containing a metal oxide. Examples of such a metal oxide include titanium oxide (TiO), silicon oxide (SiO), aluminum oxide (AlO), and zirconium oxide (ZrO). In particular, from the viewpoint of improving mass productivity, the oxide film 12 preferably contains a titanium oxide or a silicate compound. These metal oxides are preferred from the viewpoint of strength and specific resistance. In the present embodiment, the oxide film 12 contains any of these metal oxides (TiO, SiO, AlO, and ZrO) to which an organic chain is bonded, such as a titanium-based alkoxide or a silicon-based alkoxide, or specifically, a titanium alkoxide, a titanium acylate, or a titanium chelate. The organic chain preferably contains any of an epoxy group, an amino group, an isocyanurate group, an imidazole group, a vinyl group, a mercapto group, a phenol group, and a methacryloyl group. The oxide film 12 may be formed by, for example, sol-gel processing. The oxide film 12 in the present embodiment, which has a structure containing a metal oxide to which an organic chain is bonded (organic-inorganic hybrid structure), may be formed by mixing a sol-gel coating agent containing a metal alkoxide and a silane coupling agent containing an organic chain with each other, applying the mixed solution to the surface of the core main body 11, performing dehydration-bonding by heat treatment, and performing drying at a predetermined temperature.

The external electrode 30 is formed at each of two portions of the lower surface of the core 10, that is, at each of two portions of the lower surface (outer surface) of the oxide film 12. The external electrode 30 includes the base layer 31 and the plating layer 32. The base layer 31 and the plating layer 32 are formed on the lower surface of the oxide film 12 in this order.

The base layer 31 is a metal layer having high affinity for oxygen. The base layer 31 preferably contains at least one of, for example, chromium (Cr), titanium (Ti), vanadium (V), scandium (Sc), manganese (Mn), yttrium (Y), zirconium (Zr), niobium (Nb), molybdenum (Mo), technetium (Tc), hafnium (Hf), tantalum (Ta), tungsten (W), and rhenium (Re). This improves adhesion of the base layer 31 to the oxide film 12. In particular, the base layer 31 preferably contains any of Cr, Ti, and V. This further improves adhesion of the base layer 31 to the oxide film 12. The base layer 31 is not limited to a metal layer formed of a single metal of the above-described metals and may include an alloy of the above-described metals, such as Ni—Ti, Ni—V, or Ni—Cr. The base layer 31 may be formed by sputtering. The method for forming the base layer 31 is not limited to sputtering and may be a known method for forming a metal layer, such as vapor deposition, atomic layer deposition, or plating.

The plating layer 32 may be formed of a metal, such as nickel (Ni), copper (Cu), silver (Ag), or tin (Sn), or an alloy, such as Ni—Cr (chromium) or Ni—Cu. The plating layer 32 may be formed by electroplating. The plating layer 32 may include a plurality of metal layers (plating layers).

The wire 20 is a wire that includes, for example, a substantially linear conductor, such as Cu, and an insulation coating, such as a resin, covering the surface of the conductor. The wire 20 is wound around the wound core portion 13 of the core 10. Each of the end portions of the wire 20 is connected to the external electrode 30 by, for example, plating or thermo-compression bonding. This enables the wire-wound coil component 1 to be superior to a stacked-layer coil component in terms of properties. The wire 20 is sealed by the covering resin 40 disposed between the flange portions 14 and 15 of the core 10 except for portions of the wire that each extend to a portion connected to the external electrode 30. The covering resin 40 may be a magnetic resin included in the examples of the material of the core main body 11. In the present embodiment, the magnetic resin may be an epoxy resin containing a magnetic metal powder.

Effects

The wire-wound coil component 1 is an electronic component including the core main body 11 (molded body) containing a magnetic powder resin in which a resin serves as a binder, the oxide film 12 covering at least a portion of the surface (lower surface) of the core main body 11, and the external electrode 30 including the base layer 31 formed on the surface of the oxide film 12. The base layer 31 is a metal layer having high affinity for oxygen.

As described above, in the wire-wound coil component 1, the base layer 31 is a metal layer having high affinity for oxygen. Thus, the base layer 31 strongly interacts with the oxygen of the oxide film 12 and forms, for example, a covalent bond. This improves adhesion between the external electrode 30 and the core 10 (oxide film 12). Therefore, the wire-wound coil component 1 has improved bonding strength with respect to a printed circuit board.

The oxide film 12 contains a metal oxide to which an organic chain is bonded. The core main body 11 contains a magnetic powder resin in which a resin serves as a binder. Having an organic chain, the oxide film 12 strongly interacts with the resin of the core main body 11 and forms, for example, a covalent bond. This improves the adhesion between the oxide film 12 and the core main body 11. Therefore, the bonding strength of the wire-wound coil component 1 to a printed circuit board is further improved.

For example, if a glass film is used as an insulating film covering the core main body 11, thermal shock may cause a crack in the insulating film and thus, the insulating properties may be decreased. On the other hand, the oxide film 12 in the present embodiment contains a metal oxide to which an organic chain is bonded. This provides flexibility to the oxide film 12 and thus, thermal shock is unlikely to cause a crack in the oxide film 12.

As described above, the core main body 11 contains a magnetic powder resin in which a resin serves as a binder. During a producing process, after having been formed, the core main body 11 may be ground. The grinding may be barrel finishing. The grinding leads to exposure of some of the magnetic metal powder contained in the core main body 11 to the surface of the core main body 11. If the insulation coating of the wire 20 has a damaged portion, the exposed magnetic metal powder at the damaged portion may be in contact with the conductor of the wire 20. This may decrease the insulation resistance (IR) of the wire-wound coil component 1. On the other hand, the core 10 of the wire-wound coil component 1 includes the oxide film 12 covering the entire surface of the core main body 11. Thus, the oxide film 12 is interposed between the wire 20 and the core main body 11 and covers some of the magnetic metal powder exposed by the above-described grinding to the surface of the core main body 11. Therefore, high insulation resistance is obtained.

EXAMPLES

Next, each of the above-described embodiments will be further specifically described with reference to Examples and Comparative Examples.

Example 1

Production of Test Body

In the present Example, the core main body 11 was formed by using an epoxy resin. The epoxy resin was used as a binder. Specifically, a magnetic metal powder was mixed with the epoxy resin, and the mixture was molded by using a mold. The molded mixture was heated at a predetermined temperature to harden the epoxy resin, thereby forming a molded body serving as the core main body 11. Then, after barrel finishing of the core main body 11, the oxide film 12 containing TiO was formed on the surface of the core main body 11. In this case, a silane coupling agent containing an organic chain was not used. The oxide film 12 was an oxide film containing TiO and was an inorganic film containing no organic chains. Then, the base layer 31 formed of an alloy containing Cr was formed by sputtering, and the plating layer 32 was formed to provide the external electrode 30.

Measurement of Bonding Strength

A test body was mounted on a printed circuit board, for example, by using a solder paste. Regarding bonding strength (N) between the test body and the printed circuit board, bonding strength in an initial stage and bonding strength after a thermal-shock test were measured by a predetermined measuring method (in accordance with AEC-Q200). The measurement results are shown in Table 1. Table 1 shows a binder, an oxide film, a solution used (when the solution is a mixture, the ratio of the amount of a sol-gel coating agent (simply stated as "coating agent") to the amount of a coupling agent containing an organic chain (simply stated as "coupling agent")), a base layer, bonding strength (N), and bonding strength (N) (after the thermal-shock test) in the present Example 1 and in each of Examples 2 to 7 and Comparative Examples 1 and 2 that will be described later.

Example 2

A mixed solution in which a sol-gel coating agent containing TiO and a silane coupling agent containing an organic chain were mixed at a ratio of 2:1 was applied to the surface of the core main body 11 and subjected to heat treatment to form an oxide film having an organic-inorganic hybrid structure containing Si to which an organic chain is bonded and TiO. The resultant oxide film served as the oxide film 12. In this case, in the oxide film 12, the amount of Si to which an organic chain was bonded was about 0.5-fold the amount of Ti to which no organic chain was bonded. The binder was the epoxy resin and the base layer 31 was formed of the alloy containing Cr in the same manner as in Example 1.

Example 3

A mixed solution in which a sol-gel coating agent containing TiO and a silane coupling agent containing an organic chain were mixed at a ratio of 1:1 was applied to the surface of the core main body 11 and subjected to heat treatment to form an oxide film having an organic-inorganic hybrid structure containing Si to which an organic chain was bonded and TiO. The resultant oxide film served as the oxide film 12. In this case, in the oxide film 12, the amount of Si to which an organic chain was bonded was about 1.0-fold the amount of Ti to which no organic chain was bonded. The binder was the epoxy resin and the base layer 31 was formed of the alloy containing Cr in the same manner as in Example 1.

Example 4

A mixed solution in which a sol-gel coating agent containing TiO and a silane coupling agent containing an organic chain were mixed at a ratio of 2:3 was applied to the surface of the core main body 11 and subjected to heat treatment to form an oxide film having an organic-inorganic hybrid structure containing Si to which an organic chain was bonded and TiO. The resultant oxide film served as the oxide film 12. In this case, in the oxide film 12, the amount of Si to which an organic chain was bonded was about 1.5-fold the amount of Ti to which no organic chain was bonded. The binder was the epoxy resin and the base layer 31 was formed of the alloy containing Cr in the same manner as in Example 1.

Example 5

Only a silane coupling agent containing an organic chain was applied to the surface of the core main body 11 and subjected to heat treatment to form an oxide film having an organic-inorganic hybrid structure containing Si to which only an organic chain was bonded. The resultant oxide film served as the oxide film 12. The binder was the epoxy resin and the base layer 31 was formed of the alloy containing Cr in the same manner as in Example 1.

Example 6

A mixed solution in which a sol-gel coating agent containing SiO and a silane coupling agent containing an organic chain were mixed at a ratio of 1:1 was applied to the surface of the core main body 11 and subjected to heat treatment to form an oxide film having an organic-inorganic hybrid structure containing Si to which an organic chain was bonded and SiO. The resultant oxide film served as the oxide film 12. In this case, in the oxide film 12, the amount of Si to which an organic chain was bonded was about 1.0-fold the amount of Si to which no organic chain was bonded. The binder was the epoxy resin and the base layer 31 was formed of the alloy containing Cr in the same manner as in Example 1.

Example 7

A mixed solution in which a sol-gel coating agent containing TiO and a silane coupling agent containing an organic chain were mixed at a ratio of 1:1 was applied to the surface of the core main body 11 and subjected to heat treatment to form an oxide film having an organic-inorganic hybrid structure containing Si to which an organic chain was bonded and TiO. The resultant oxide film served as the oxide film 12. In this case, in the oxide film 12, the amount of Si to which an organic chain was bonded was about 1.0-fold the amount of Ti to which no organic chain was bonded. In Example 7, the base layer 31 was formed of an alloy containing Ti. The binder was the epoxy resin in the same manner as in Example 1.

Comparative Example 1

The oxide film 12 was not included in the structure (stated as "none" in Table 1). The binder was the epoxy resin and the base layer 31 was formed of the alloy containing Cr in the same manner as in Example 1.

Comparative Example 2

The binder was a polysiloxane resin, and the oxide film 12 was not included in the structure (stated as "none" in Table 1). The base layer 31 was the alloy containing Cr.

TABLE 1

| No. | Binder | Oxide film | Solution used (Coating agent/Coupling agent) | Base layer | Bonding strength (N) | Bonding strength (N) (After thermal-shock test) |
|---|---|---|---|---|---|---|
| Example 1 | Epoxy resin | TiO contained | Sol-gel coating agent containing TiO | Alloy containing Cr | 205 | 140 |
| Example 2 | Epoxy resin | Organic-inorganic hybrid structure containing Si to which an organic chain is bonded and TiO | Sol-gel coating agent containing TiO Silane coupling agent containing an organic chain (2:1) | Alloy containing Cr | 215 | 210 |
| Example 3 | Epoxy resin | Organic-inorganic hybrid structure containing Si to which an organic chain is bonded and TiO | Sol-gel coating agent containing TiO Silane coupling agent containing an organic chain (1:1) | Alloy containing Cr | 215 | 210 |
| Example 4 | Epoxy resin | Organic-inorganic hybrid structure containing Si to which an organic chain is bonded and TiO | Sol-gel coating agent containing TiO Silane coupling agent containing an organic chain (2:3) | Alloy containing Cr | 210 | 200 |
| Example 5 | Epoxy resin | Organic-inorganic hybrid structure containing Si to which an organic chain is bonded | Silane coupling agent containing only an organic chain | Alloy containing Cr | 200 | 200 |
| Example 6 | Epoxy resin | Organic-inorganic hybrid structure containing Si to which an organic chain is bonded and SiO | Sol-gel coating agent containing SiO Silane coupling agent containing an organic chain (1:1) | Alloy containing Cr | 200 | 200 |
| Example 7 | Epoxy resin | Organic-inorganic hybrid structure containing Si to which an organic chain is bonded and TiO | Sol-gel coating agent containing TiO Silane coupling agent containing an organic chain (1:1) | Alloy containing Ti | 215 | 215 |
| Comparative Example 1 | Epoxy resin | None | — | Alloy containing Cr | 40 | 40 |
| Comparative Example 2 | Polysiloxane resin | None | — | Alloy containing Cr | 45 | 45 |

Results

As shown in Table 1, regarding the bonding strength of the test body in Comparative Example 1 to a printed circuit board, each of the bonding strength in the initial stage and the bonding strength after the thermal-shock test was 40 (N). Regarding the bonding strength of the test body in Comparative Example 2 to a printed circuit board, each of the bonding strength in the initial stage and the bonding strength after the thermal-shock test was 45 (N). On the other hand, in each of Examples 1 to 7, the bonding strength with respect to a printed circuit board is 200 (N) or higher in the initial stage. In other words, it has been found that when the oxide film 12 and the external electrode 30 including the base layer 31, which is a metal layer having high affinity for oxygen, are included, the bonding strength of the test body to a printed circuit board is improved. In each of Examples 2 to 7, in which the oxide film 12 is an oxide film having an organic-inorganic hybrid structure containing a metal oxide to which an organic chain is bonded, not only the bonding strength in the initial stage, but also the bonding strength after the thermal-shock test is 200 (N) or higher. In other words, it has been found that the oxide film 12 containing a metal oxide to which an organic chain is bonded also improves thermal-shock resistance. In Examples 1 to 7, high insulation resistance (IR) was obtained.

As described above, according to the preferred embodiments, the following effects are obtained.

(1) The wire-wound coil component 1 is an electronic component including the core main body 11 (molded body) containing a magnetic powder resin in which a resin serves as the binder, the oxide film 12 covering at least a portion of the surface (lower surface) of the core main body 11, and the external electrode 30 including the base layer 31 formed on the surface of the oxide film 12. The base layer 31 is a metal layer having high affinity for oxygen. The base layer 31 strongly interacts with oxygen of the oxide film 12 and forms, for example, a covalent bond, thereby improving adhesion between the external electrode 30 and the core 10 (oxide film 12). Therefore, the wire-wound coil component 1 has improved bonding strength with respect to a printed circuit board.

(2) The oxide film 12 is preferably an oxide film containing a metal oxide to which an organic chain is bonded, that is, an oxide film having an organic-inorganic hybrid structure. The core main body 11 contains a magnetic powder resin in which a resin serves as a binder. Thus, the organic chain of the oxide film 12 strongly interacts with the resin of the core main body 11 and forms, for example, a covalent bond. This improves the adhesion between the oxide film 12 and the core main body 11. Therefore, the bonding strength of the wire-wound coil component 1 to a printed circuit board is further improved.

(3) The oxide film 12 preferably includes an organic chain. In this case, the oxide film 12 has flexibility. Thus, thermal shock does not decrease the bonding strength of the wire-wound coil component 1 to a printed circuit board, thereby improving thermal-shock resistance.

(4) It is preferable that the wire 20 be wound around the core main body 11 and that the oxide film 12 be interposed between the core main body 11 and the wire 20. In this case, if some of a magnetic metal powder is exposed to the surface of the core main body 11, the oxide film 12 covers the magnetic metal powder. Therefore, high insulation resistance is obtained.

(5) In the oxide film 12, the amount of a metal element, such as Si or Ti, to which an organic chain is bonded is preferably about 0.5-fold of more and about 1.5-fold or less the amount of a metal element, such as Si or Ti, to which no organic chain is bonded. In this case, it has been found that the thermal-shock resistance is reliably improved.

The above-described embodiments may be implemented in the following modified examples.

In the above-described embodiments, the wire-wound coil component 1 has two external electrodes 30 on the flange portion 15. The wire-wound coil component 1 may be so called a horizontally wire-wound coil component in which each of the two flange portions has an external electrode and in which the core portion is supported substantially parallel to a printed circuit board. The number of the external electrodes 30 may be more than two.

In the above-described embodiment, the flange portions 14 and 15 are respectively disposed at one end portion and the other end portion of the wound core portion 13 of the wire-wound coil component 1. The size of the flange portions 14 and 15 may be appropriately changed individually. The flange portion 14 at the upper end of the wound core portion 13 may be omitted.

In the above-described embodiment, the wire-wound coil component 1 is illustrated as an electronic component. The electronic component may be a layer-stacked coil component. In this case, the molded body serves as an element body. In addition, examples of an electronic component having a molded body and external electrodes include capacitors using a dielectric body, piezoelectric elements using a piezoelectric body, and varistors using a semiconductor.

A part of the above-described embodiments and modifications may be appropriately replaced by known configurations. The above-described embodiments and modifications may be partly or entirely combined with other embodiments or examples.

While some embodiments of the disclosure have been described above, it is to be understood that variations and modifications will be apparent to those skilled in the art without departing from the scope and spirit of the disclosure. The scope of the disclosure, therefore, is to be determined solely by the following claims.

What is claimed is:

1. An electronic component comprising:

a molded body containing a magnetic powder resin in which a resin serves as a binder;

an oxide film covering at least a portion of a surface of the molded body; and an external electrode including a base layer formed on a surface of the oxide film and a plating layer formed on the base layer, the base layer being a metal layer having high affinity for oxygen, wherein the base layer contains at least one of Cr, Ti, V, Sc, Mn, Y, Zr, Nb, Mo, Tc, Hf, Ta, and Re, the plating layer comprises at least one of Cu, Ni—Cr or Ni—Cu, and the oxide film contains a metal oxide to which an organic chain is chemically bonded.

2. The electronic component according to claim 1, wherein, in the oxide film, an amount of a metal element to which an organic chain is bonded is from about 0.5-fold to about 1.5-fold the amount of a metal element to which no organic chain is bonded.

3. The electronic component according to claim 2, wherein the oxide film contains TiO or SiO.

4. The electronic component according to claim 2, wherein the organic chain contains any of an epoxy group, an amino group, an isocyanurate group, an imidazole group, a vinyl group, a mercapto group, a phenol group, and a methacryloyl group.

5. The electronic component according to claim 2, wherein the binder is an epoxy resin.

6. The electronic component according to claim 1, wherein the oxide film contains TiO or SiO.

7. The electronic component according to claim 6, wherein the organic chain contains any of an epoxy group, an amino group, an isocyanurate group, an imidazole group, a vinyl group, a mercapto group, a phenol group, and a methacryloyl group.

8. The electronic component according to claim 1, wherein the organic chain contains any of an epoxy group, an amino group, an isocyanurate group, an imidazole group, a vinyl group, a mercapto group, a phenol group, and a methacryloyl group.

9. The electronic component according to claim 1, wherein the binder is an epoxy resin.

10. The electronic component according to claim 1, wherein the molded body is wound with a wire, and an end portion of the wire is connected to the external electrode.

11. The electronic component according to claim 10, wherein the oxide film is further interposed between the wire and the molded body.

12. The electronic component according to claim 10, wherein the oxide film covers an entire surface of the molded body.

13. The electronic component according to claim 11, wherein the oxide film covers an entire surface of the molded body.

* * * * *